United States Patent [19]

Drouet

[11] Patent Number: 5,245,627
[45] Date of Patent: Sep. 14, 1993

[54] USE OF A RADIATING ARC FURNACE FOR TREATING A DROSS CONTAINING A METAL IN ORDER TO RECOVER THIS METAL

[75] Inventor: Michel G. Drouet, Quebec, Canada
[73] Assignee: Hydro Quebec, Montreal, Canada
[21] Appl. No.: 702,430
[22] Filed: May 20, 1991

[30] Foreign Application Priority Data

Nov. 23, 1990 [CA] Canada .................................. 2030727

[51] Int. Cl.$^5$ .............................................. H05B 7/00
[52] U.S. Cl. ............................................ 373/20; 373/2;
373/19; 373/60; 373/62; 373/86; 75/10.19;
75/10.21; 432/160
[58] Field of Search .................... 373/2, 20, 60, 61, 62,
373/68, 79, 82, 19, 70, 84, 86; 75/10.19, 10.21,
10.22; 432/160, 161; 266/200

[56] References Cited

U.S. PATENT DOCUMENTS

| | | | |
|---|---|---|---|
| 3,102,154 | 8/1963 | Renton | 373/62 |
| 3,795,752 | 3/1974 | Verhoeven et al. | 373/20 |
| 3,917,241 | 11/1975 | Steffora et al. | 373/115 |
| 3,937,866 | 2/1976 | Sunnen et al. | 373/20 |
| 4,006,284 | 2/1977 | Segsworth et al. | 373/19 |
| 4,217,462 | 8/1980 | Rawles et al. | 373/20 |
| 4,320,098 | 3/1982 | Huckabay et al. | 423/132 |
| 4,827,486 | 5/1989 | Brotzmann et al. | 373/2 |
| 4,952,237 | 8/1990 | Dube et al. | 373/20 |
| 4,959,100 | 9/1990 | Dube et al. | 75/10.19 |
| 4,960,460 | 10/1990 | Dube et al. | 75/10.19 |

FOREIGN PATENT DOCUMENTS

1255914 7/1990 Canada .

OTHER PUBLICATIONS

Mac Ral, D. R., "Plasma Arc Process Systems, Reactors, and Applications", Plasma Chem. & Plasma Processing, vol. 9, No. 1, Mar. 9, 1989, Bristol, GB, pp. 85–118.
Fused Minerals . . . Statistical Process Control and Quality Assurance-C-E Minerals.

*Primary Examiner*—Bruce A. Reynolds
*Assistant Examiner*—Tu Hoang
*Attorney, Agent, or Firm*—Foley & Lardner

[57] ABSTRACT

A process is disclosed, for treating dross containing a metal such as aluminum, in order to recover this metal, In this process, the dross to be treated is introduced into a rotary or oscillating furnace, in which it is heated to a temperature above the melting point of the metal to be recovered while the furnace is rotated or oscillated to cause the metal to be recovered to separate from the dross. After the separation is completed, the metal to be recovered is removed from the furnace prior to removing the balance of the dross. In this process, the furnace that is used is a radiating arc furnace having two opposite electrodes which are preferably made of graphite, between which an electrical arc is generated and maintained in order to provide the desired heating.

8 Claims, 1 Drawing Sheet

USE OF A RADIATING ARC FURNACE FOR TREATING A DROSS CONTAINING A METAL IN ORDER TO RECOVER THIS METAL

BACKGROUND OF THE INVENTION a) Field of the invention

The present invention relates to a process of treating at a high temperature, a dross containing a metal in order to recover the metal.

More particularly, the invention relates to a process for treating a dross containing a metal, in particular aluminum, in a rotary or oscillating furnace, in order to recover the metal from the dross.

In the following description, only aluminum has been specifically mentioned as metal to be recovered. If the recovery of this particular metal from the dross floating on the top of an aluminum bath is actually one of the most important applications of the process according to the invention, it is worth mentioning that the invention as described and claimed hereinafter is not exclusively restricted to the recovery of aluminum. As a matter of fact, the process according to the invention is also useful for the recovery of other metals, in particular non-ferrous metals, from drosses containing them.

b) Brief description of the prior art

It is a conventional practice to transfer the aluminum produced by electrolytic reduction of alumina in a furnace (usually called "holding furnace"), where the metal is eventually remelted and held in melted form before being transferred to another location where it is laminated and/or otherwise treated. In the holding furnace, a foam-like mixture of aluminum and alum called "dross", forms on the surface of the bath. The dross that may represent up to 5% of the melted metal bath, contains a substantial amount of aluminum, in the order of 50%. Of course the recovery of the aluminum in the dross is very important recovery can be carried out by treating the dross in a furnace at a high temperature. For this purpose, several furnaces nave been devised and are presently being used in aluminum plants. To the Applicant's knowledge, the existing furnaces are exclusively heated with fuel- or gas-operated burners, or with plasma torches.

The use of fuel- or gas-operated burners for heating the dross in a furnace in order to recover the aluminum contained therein, has the major drawback of requiring the addition of salt fluxes such as NaCl or KCl, in order to increase the percentage of aluminum recovery.

The use of a plasma torch as suggested in Canadian patent No. 1,255,914 issued on Apr. 20, 1990 to ALCAN INTERNATIONAL LTD., permits the above mentioned drawback to be overcome. Indeed, the use of the plasma torch creates higher temperatures in a furnace and thus avoids the necessity of adding salt fluxes. However, the use of the plasma torch has a major drawback, due to the way the existing torches are cooled with water. Indeed, in case of a water leak, heavy explosions may occur and result in serious accidents.

In the above mentioned Canadian patent No. 1,255,914, it is essentially suggested to operate the plasma torch in the non-transferred arc mode. It is however mentioned in page 6 of the specification, that under certain circumstances, it may be possible to operate the plasma torch in the arc transferred mode. This patent does not explain however how such an arc transfer can be reduced to practice, nor the advantages that may derive therefrom.

In both cases anyway, use is made of a plasma torch that must necessarily be cooled thereby water, with creating the drawback discussed above.

OBJECTS OF THE INVENTION

A first object of the present invention is to provide a new process for treating a dross containing a metal, especially an aluminum dross, in order to recover the metal contained therein, which process permits to the above mentioned drawbacks to be overcome.

More particularly, the first object of the invention is to provide a process for treating a dross in a rotary or oscillating furnace, which is much less polluting than the existing processes inasmuch as it does not require the addition of salt fluxes, and is also much more economical inasmuch as it does not require a substantial amount of plasma gas as is required when use is made of a plasma torch.

Another object of the invention is to provide the process for treating a dross containing a metal in order to recover the same, which is much safer the existing processes, inasmuch as it does not use of require the component that is cooled with water and thereby a precludes an explosion in case of a water leak.

A further object of the invention is to provide a process for treating a dross containing a metal, especially aluminum, in order to recover this metal, which is more efficient than all the processes known to the Applicant, including the above mentioned process of using a plasma torch, inasmuch as, on the one hand, heating is essentially carried out by radiation rather than by convection and, on the other hand, there is no thermal loss due to the water cooling of the torch or the exhaust from the furnace of substantial amounts of combustion gas when a burner is being used.

SUMMARY OF THE INVENTION

The process according to the invention for treating a dross containing a metal, such as aluminum, in order to recover this metal, comprises the steps of:
  introducing the dross to be treated into a rotary or oscillating furnace;
  heating the dross inside the furnace to a temperature above the melting point of the metal to be recovered;
  rotating or oscillating the furnace while the dross is heated, to cause the metal to be recovered to separate from the dross;
  removing from the furnace the separated metal to be recovered; and
  removing the balance of the dross from the furnace.

In accordance with the invention, this process is characterized in that the furnace that is being used is a radiating arc furnace comprising two opposite electrodes between which an electrical arc is generated and maintained to provide the requested heating.

According to a preferred embodiment of the invention, the radiating arc furnace that is being used, has a horizontal longitudinal axis, with which are aligned at least one and preferably both of said electrodes. The rotation or oscillation of the furnace can be in the order of 1 to 20 turns or swings per minute, and more preferably about 10 turns or swings per minute, is carried out about the longitudinal axis.

This rotation or oscillation can be carried out in a continuous or intermittent manner.

According to another particularly preferred embodiment of the invention, the electrodes that are being used are made of graphite and are mounted at both ends of the longitudinal axis of the furnace, so as to be movable one toward the other as they erode. In practice, this makes the structure of the furnace used in accordance with the invention, very similar to the radiating arc furnace of the Mazieres type, which is well known to those skilled in the art of metallurgy.

In order to stabilize the arc along the longitudinal axis of the furnace, at least one of the electrodes can be provided with a small axial bore through which a plasma gas, that can be selected from the group consisting of Ar, $N_2$, $H_2$, $CH_4$, CO, $CO_2$, air or mixtures thereof, may be injected.

As can be understood, the process according to the invention makes use of a radiating arc furnace which can operate without any injection of plasma gas although a small amount thereof may be of some use, as was explained hereinabove. This is substantially different from the prior art furnace which is heated by a plasma torch, and wherein the amount of plasma gas injected through the torch is very large.

As the furnace that is being used, is a radiating arc furnace, the dross is heated directly by arc radiation. Once again, this is substantially different from the prior art furnaces making use of a plasma torch, where the dross is heated by convention with the hot plasma gas exhausting from the torch.

As the arc is formed between two solid electrodes, such as graphite electrodes, no water is required. This gets rid of any risk of explosion die to water leakage.

The invention and its numerous advantages will be better understood from the following detailed but non-restrictive description of the way the process according to the invention can be reduced into practice.

DETAILED DESCRIPTION OF THE INVENTION

Figure 1:
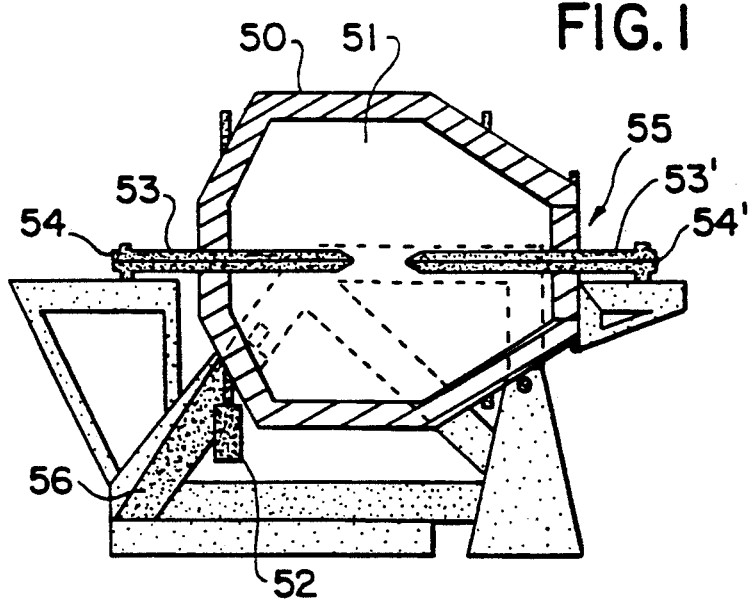
FIG. 1 is a cross-sectional, side elevational view of a radiating arc furnace shown in an operative position for carrying out the process according to the invention.
Figure 2:
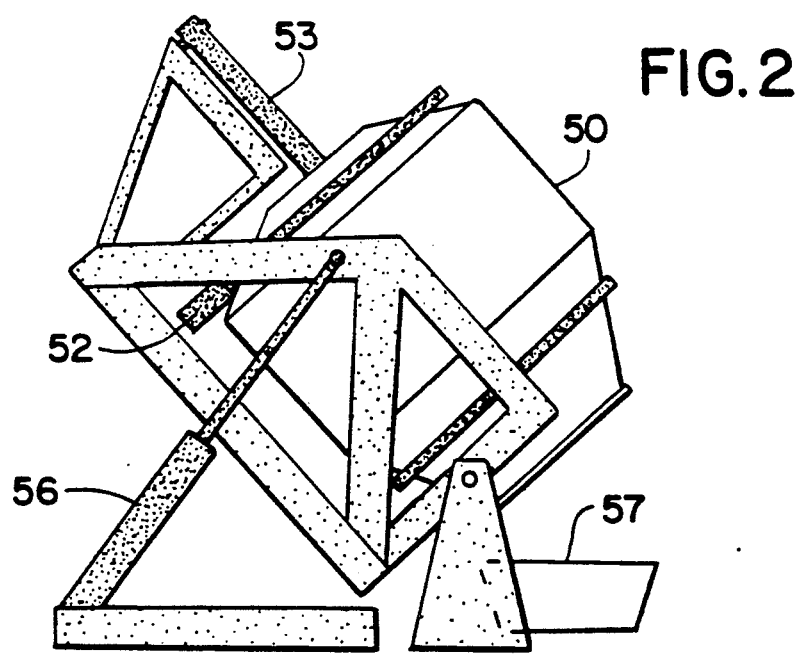
FIG. 2 is a side elevational view of the furnace of FIG. 1 as shown in a pouring position.

As was already explained, the process according to the invention makes use of a radiating arc furnace 50 of the rotating or oscillating type. This radiating arc furnace preferably has an internal chamber 51 that is generally ovoid in shape and of which the long axis, hereinafter called the longitudinal axis, is essentially horizontal in use (see FIG. 1). Of course, this furnace is provided with driving means 52 to rotate or oscillate it, preferably about its longitudinal axis.

Numerous types of radiating arc furnace of the rotating type have developed and are presently used in the field of metallurgy. By way of example, reference can be made to the radiating arc furnace named after its inventor, Mr. MAZIERES. This furnace comprises a chamber which, in this particular case, is spherical instead of ovoid. At one end of this chamber 51, a door 55 is provided to introduce or remove the substances to be treated. This furnace is also provided with tilting means to lower one or both of its ends, for the purpose of emptying the chamber 51.

At each end of the furnace 50, an electrode 53, 53' is mounted in line onto the horizontal axis. These electrodes face each other and are located inside the chamber 51. The distance between the facing ends of both electrodes 53, 53' can be adjusted at will with adjusting means known per se, which can be controlled by a programmed computer in such a manner as to adjust the length of the arc as a function of the selected conditions of operation.

The electrodes that are being used, are preferably made of graphite although other material could eventually be used. The main advantage of using graphite is that this material is very resistant and thus increases the life duration of the electrodes, thereby reducing the period where the furnace has to be stopped for replacing the electrodes.

According to a very particular embodiment of the invention, the electrodes can be provided with axial bores 54, 54' through which a plasma gas can be coaxially injected into the furnace.

The flow rate of the plasma gas that is injected, needs not be high, since its utility is essentially to stabilize the arc and make sure that it is axially aligned along the longitudinal axis of the furnace. The injection of a plasma gas may also be useful to form the arc when the furnace is started.

The plasma gas that may be injected through the electrode(s), may consist of argon, nitrogen, hydrogen, methane, carbon monoxide or dioxide, air, or mixtures thereof. The selection of a particular gas may have some benefits under certain in circumstances, when one wants to have the metal subjected to a simultaneous, additional treatment.

The process according to the invention for recovery of a metal from a dross in which it is contained, starts by the introduction of the dross to be treated inside the chamber 51 of the furnace. Then, the dross is heated by connecting the electrodes 53, 53' to an electric current supply with some electrical connecting means known per se, in such a manner as to form an arc between the electrodes. As previously indicated, the formation of the arc between the electrodes can be improved by injecting a small amount of plasma gas inside the chamber through the axial bore provided in one or preferably both electrodes, this plasma gas being injected at a pressure sufficient to keep the arc aligned on the longitudinal axis of the furnace.

Once it is formed, the arc that extends between the facing ends of the electrodes, heats by radiation the dross at a temperature of up to about 1000° C.

While heating is started, the furnace 50 is made to rotate or oscillate about its axis. This rotation or oscillation may vary from 1 to 20 turns or swings per minute but is preferably about 10 turns or swings per minute, when the required temperature of treatment has been reached. As can be understood, the furnace may be fully rotated or only oscillated about its axis.

The other conditions of operation and treatment inside the furnace in the process according to the invention, are otherwise very similar to those disclosed in great detail in Canadian patent No. 1,255,914.

Once the treatment is completed, the rotation and/or oscillation is stopped, as well as the heating. The furnace is opened, the electrodes located close to this door is moved back and the furnace is tilted downwardly towards its open end to pour the liquid metal, such as liquid aluminum, out of the chamber and into a container 57 (see FIG. 3) is thus conducted by a mere pouring. When this recovery is achieved, the balance of the dross may then be recovered as is known per se.

I claim:

1. A process of treating a dross containing a metal having a given melting point in order to recover the metal having a given melting point in order to recover the metal in a radiating arc furnace having a longitudinal axis, the process comprising the steps of:
   A) introducing the dross into the radiating arc furnace having a pair of opposing non-water cooled, graphite, electrodes which are aligned along said longitudinal axis;
   B) generating and maintaining an arc between said electrodes to create radiation;
   C) heating the dross by the radiation to a temperature above the melting point of the metal such that the metal becomes a liquid;
   D) subjecting said furnace to a motion about said longitudinal axis, said motion selected from the group consisting of rotation, oscillation, and a combination of oscillation and rotation, said motion causing the metal to separate from the dross;
   E) injecting a plasma gas through an axial bore provided in at least one of the electrodes, thereby stabilizing the arch along said longitudinal axis;
   F) removing the liquid metal from the furnace; and
   G) removing the dross from the furnace.

2. The process of claim 1 wherein the plasma gas injected through the bore is selected gases from the group consisting of Ar, $N_2$, $H_2$, $CH_4$, CO, and mixtures of at least two said gases.

3. The process of claims 1 or 2, wherein step D) is continuously performed during steps B), C), and E).

4. The process of claims 1 or 2, wherein step D) is intermittently performed during steps B), C), and E).

5. The process according to claims 1 or 2, wherein the dross that is treated is an aluminum dross, and the metal is aluminum.

6. The process according to claim 1, including providing said furnace with an ovoid internal chamber and introducing the dross into the chamber.

7. The process according to claim 2, including providing said furnace with an ovoid internal chamber and introducing the dross into the chamber.

8. The process according to claim 1, further comprising the step of holding the furnace in a horizontal position during heating.

* * * * *